May 20, 1958     O. E. ANDRUS     2,835,404

PRESSURE VESSEL

Filed Aug. 13, 1956

INVENTOR.
ORRIN E. ANDRUS
BY
Andrus & Scales
Attorneys

United States Patent Office 2,835,404
Patented May 20, 1958

2,835,404

PRESSURE VESSEL

Orrin E. Andrus, Madison, Wis., assignor to A. O. Smith Corporation, Milwaukee, Wis., a corporation of New York Application August 13, 1956, Serial No. 603,658

2 Claims. (Cl. 220—3)

This invention relates to cylindrical pressure vessels, and more particularly to a closure stressed layer vessel.

Heretofore, in the construction of layer vessels it has been the practice to attach the heads to the inner layers and to consider the outer layers as adding hoop or girth strength to the vessels. Where the vessel was to withstand very high pressures in service and the total wall thickness to diameter ratio resulted in initial stressing of only the inner layers, it has been the practice to utilize pre-compression of the inner layers whereby the outer layers become useful load bearing layers.

The present invention avoids the necessity for pre-compression, and is based on the discovery of a novel construction for cylindrical multi-layer pressure vessels which strengthens the vessel so that in some instances wall thickness may actually be reduced over that of a prestressed vessel, with no reduction in the safe maximum working pressures.

Most multi-layer pressure vessel manufacturers have heretofore designed their vessels with very bulky end closures. These closures have often taken the form of heavy annular outwardly extending flanges which were welded to the entire end sections of the vessel wall, and heads which were bolted or otherwise secured thereto.

In a pressurized cylindrical multi-layer vessel the radial stress is approximately twice the longitudinal stress. In previous constructions the vessels have been sufficiently strong radially but almost twice as strong as necessary in the longitudinal direction.

The present invention takes this difference in stress into account and more nearly equalizes the strength of the vessel in the radial and longitudinal directions, while at the same time substantially reducing the cost of manufacture.

The invention contemplates a multi-layer vessel constructed so that the outer layers take substantially all of the longitudinal thrust and thereby put the inner layers under compression. It has been determined that in a multi-layer vessel, the inner layers take most of the radial thrust due to the fact that they are closely adjacent the pressure being applied. Compressing the inner layers during operation of the vessel as contemplated by the invention, strengthens the inner layers against radial thrust and more nearly equalizes the stress distribution.

The accompanying drawings illustrate the best mode presently contemplated by the inventor for carrying out the invention.

Figure 1:
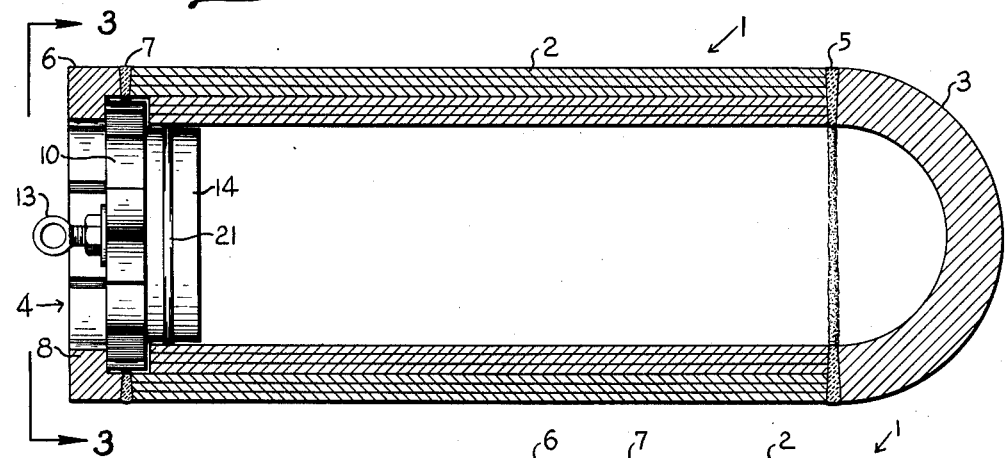
Figure 1 is a central longitudinal section of a multi-layer pressure vessel constructed in accordance with the invention with the head shown in elevation.

As shown in the drawings, the invention is embodied in a cylindrical pressure vessel 1 fabricated from a plurality of concentrically disposed layers or laminations 2 and closed at the ends by closures 3 and 4. Closure 3 is shown as a hemispherical head which is permanently attached to the ends of all the layers 2 by a suitable girth weld 5.

The number of layers 2 shown is six, although two or more layers may be used, depending on the vessel requirements. All the layers 2 extend axially from closure 3 to the other end of the vessel with the outer three layers extending a short distance beyond the inner three layers.

Figure 3:
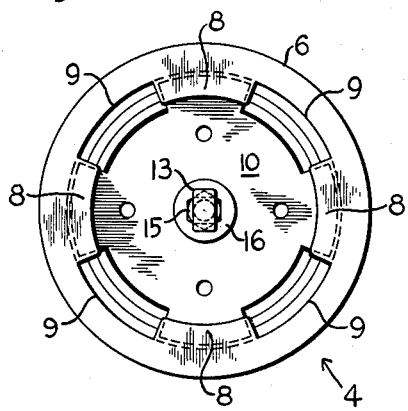
Fig. 3 is an end elevation of the vessel, taken on line 3—3 of Figure 1.

Closure 4 is removable and comprises an end ring 6 which is secured only to the outer three layers 2, hereinafter called the outer layers, by a suitable weld 7. End ring 6 may be of forged construction and is provided with a radially inwardly extending flange 8 at its outer end. As shown in Fig. 3, flange 8 is provided with a series of circumferentially spaced bayonet slots or openings 9 which allow for the passage therethrough of a slotted end plug 10. The maximum diameter of plug 10 approaches the inside diameter of the outer layers 2, while the maximum diameter of openings 9 approaches the inside diameter of ring flange 8.

Plug 10 is shown as having a circular opening extending the entire length of its longitudinal axis which allows the plug to be slidably mounted on a central shaft 11 prior to insertion of plug 10 into the end of the vessel.

Shaft 11 has a shoulder 12 disposed approximately midway of its length and has a reduced threaded portion disposed outwardly of the shoulder. An eyelet 13 is welded to the outer end of shaft 11 for handling and other purposes. The inner end of shaft 11 is welded to a circular plate 14 which has a diameter approaching the inside diameter of the vessel wall.

A nut 15 and washer 16 are disposed on the threaded portion of shaft 11 between eyelet 13 and shoulder 12, nut 15 serving to tighten the shoulder parts as will be described.

Plate 14 is disposed normal to the longitudinal axis of shaft 11 and has an axially outwardly extending cylindrical flange 17 which is provided on its outer edge with an outwardly beveled portion 18.

The inner circumferential portion of plug 10 is cut away to provide an annular surface 19 and an inwardly beveled shoulder 20. The inside diameter of flange 17 is slightly more than the diameter of surface 19 so that flange 17 may fit over the inner end of plug 10. Beveled shoulder 20 of plug 10 faces beveled portion 18 of flange 17 so that the two create a substantially V-like annular groove spaced slightly inward from the recessed ends of inner layers 2 and encircling surface 19 to receive an annular O-ring 21.

Figure 2:
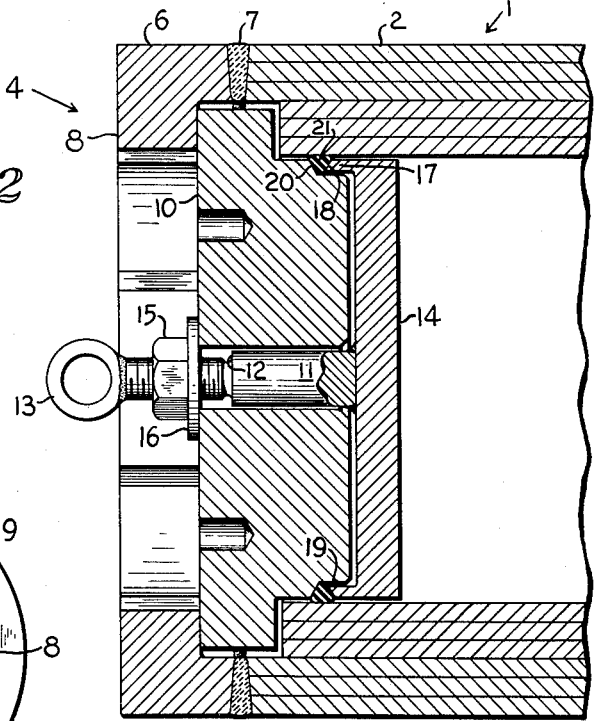
Fig. 2 is an enlarged longitudinal section of the head end of the vessel, showing the details of the closure.

Plug 10, shaft 11, plate 14 and O-ring 21 are preferably loosely assembled prior to their insertion into the vessel. Final assembly of the closure is accomplished by passing plug 10 through end ring 6 so that the unslotted portions of plug 10 coincide with slots 9 of flange 8. When plug 10 has passed beyond flange 8, plug 10 is turned to lock the closure in place and prevent outward displacement thereof. Nut 15 is then turned to pull plate 14 outwardly to tighten beveled portion 18 against O-ring 21, thereby squeezing the O-ring against the inner wall of vessel 1. As best seen in Fig. 2, O-ring 21 is seated axially inwardly of the ends of the inner three layers, thus preventing fluid from getting between the layers and disrupting the proper stressing of the vessel when the vessel is pressurized.

When vessel 1 is pressurized, the longitudinal pressure acts on plate 14 in an outwardly direction and O-ring 21 will be squeezed tighter against the inner surface of the vessel wall to thereby effectively seal the vessel against leakage. Pressurized fluid also passes between the inner layer 2 and flange 17 to act directly on O-ring 21. The greater the pressure, the tighter the seal will be. Under extremely high pressures, plate 14 should be seated against plug 10 to prevent extrusion of O-ring 21 between plug 10 and the vessel wall.

The three inner layers and three outer layers form, in effect, an inner wall and an outer wall, respectively, which together with the end closures form the completed vessel. The inner wall is substantially free floating relative to the outer wall. Both closures 3 and 4 are sealed to the inner wall of the vessel to retain the working pressure in the vessel and thereby prevent leakage between the walls.

When vessel 1 is pressurized, the longitudinal pressure will bear directly on closures 3 and 4. Under pressure, end plug 10 will bear against end ring 6 to stress the outer wall longitudinally. There will be substantially no longitudinal stress on the inner wall, since closure 4 is only connected to the outer wall. Weld 5 acts only as an anchor for layers 2. The inner and outer walls are substantially separate.

Because of the radial reinforcement of the outer wall by the inner wall and because of the longitudinal tensioning of the outer wall, the latter will tend to tighten inwardly and put the inner wall under compression. This will thereby strengthen the inner wall against radial thrust due to pressure. It can thus be seen that pressurization actually increases the strength of the vessel, and precompression is unnecessary. The longitudinal pressure is substantially by-passed around the inner layers to effect longitudinal stressing of the outer layers only, which in turn strengthens the vessel wall against radial pressures.

Since the radial stress is approximately equal to twice the longitudinal stress, and since the entire vessel wall takes the radial load while only about one-half takes the longitudinal load, the strength of the vessel is more nearly equalized in relation to the stresses it must undergo during pressurization.

In addition, the inner layers are substantially free floating relative to the outer layers and take most of the radial thrust. The inner layers are strengthened against radial thrust by the compressive force exerted by the outer layers, thereby eliminating the need for precompression.

By providing a closure 4 which is secured only to the outer layers, the longitudinal thrust is transmitted to the outer layers only. A closure similar to closure 4 may be used in place of closure 3 if desired, but this is not necessary as long as the inner layers are kept relatively free from longitudinal stress.

It would be possible to construct the vessel so that each layer 2 comprised a pair of large rings or bands joined together adjacent their abutting edges by a girth weld. If each of these welds was kept separate from the adjacent weld, the vessel would still function in the manner described.

It would also be possible to join all the outer layers with a single girth weld, and to join the inner layers with another girth weld separated from the outer weld. If, however, a single girth weld joined all the layers, the vessel would only function as described between such a weld and a closure such as closure 4.

The invention provides a novel closure-stressed construction for a multi-layer vessel which eliminates the need for bulky end closures and costly prestressing procedures, and yet provides adequate strength under extremely high pressures. It is possible with such a construction to reduce the thickness of the vessel wall over prior constructions without reducing the load carrying capacity.

Various modes of carrying out the invention are contemplated as being within the scope of the following claims particularly pointing out and distinctly claiming the subject matter which is regarded as the invention.

I claim:

1. A closure stressed multi-layer pressure vessel, comprising a cylindrical inner wall and a cylindrical outer wall with each wall having a plurality of concentrically disposed laminations, at least one end portion of said inner wall being free floating relative to said outer wall; and closure means disposed at the free floating end of the inner wall of the vessel and comprising, an end ring secured to an end of the laminations of the outer wall with said ring having a flange extending radially inwardly therefrom, a circular member disposed between said flange and the end of the laminations of the inner wall, and means disposed axially inwardly from said member and inwardly from the end of the inner wall to seal the vessel against leakage at the closure, said closure means being substantially free from connection to the inner wall so that substantially all of the longitudinal stress is bypassed around at least a portion of said inner wall and transmitted to said outer wall, said inner wall withstanding the radial stress due to internal pressure and being compressed by said outer wall when the latter is under longitudinal stress during pressurization of the vessel.

2. The vessel of claim 1 in which the sealing means comprises a circular plate having an outwardly extending annular flange, and an O-ring disposed between said annular flange and said circular member and adapted to be squeezed against the inner surface of the inner wall upon pressurization of the vessel.

References Cited in the file of this patent

UNITED STATES PATENTS

| 226,195 | Puffer | Apr. 6, 1880 |
| 1,903,168 | Cordrey | Mar. 28, 1933 |
| 2,337,247 | Kepler | Dec. 21, 1943 |

FOREIGN PATENTS

| 11,678 | Australia | Mar. 6, 1933 |